(12) United States Patent
Fenn et al.

(10) Patent No.: US 7,576,160 B2
(45) Date of Patent: Aug. 18, 2009

(54) ELECTROCOAT COMPOSITION IMPARTING SWEAT RESISTANCE AND METHODS FOR USING THE SAME

(75) Inventors: David R. Fenn, Allison Park, PA (US); Mark L. Follet, Allison Park, PA (US); Anthony D. Kulfan, Mars, PA (US); Jean-Pierre Marthe, Estreux (FR); Fabrice Leusiere, Gommegnies (FR)

(73) Assignee: PPG Industries Ohio, Inc., Cleveland, OH (US)

( * ) Notice: Subject to any disclaimer, the term of this patent is extended or adjusted under 35 U.S.C. 154(b) by 709 days.

(21) Appl. No.: 11/123,795

(22) Filed: May 6, 2005

(65) Prior Publication Data

US 2006/0249389 A1 Nov. 9, 2006

(51) Int. Cl.
- *C08G 18/46* (2006.01)
- *C08G 18/62* (2006.01)
- *C08G 18/79* (2006.01)
- *C09D 5/46* (2006.01)

(52) U.S. Cl. ............... 525/329.8; 525/328.9; 525/329.7; 525/329.9; 525/330.4; 525/330.5; 525/333.5; 525/333.6; 525/374; 525/383; 427/458

(58) Field of Classification Search ............ 525/328.9, 525/329.7, 329.8, 329.9, 330.4, 330.5, 333.5, 525/333.6, 374, 383; 427/458
See application file for complete search history.

(56) References Cited

U.S. PATENT DOCUMENTS

| | | | | |
|---|---|---|---|---|
| 4,683,173 | A | * | 7/1987 | Abbey ..................... 428/425.8 |
| 5,066,689 | A | | 11/1991 | Patzschke et al. ............ 523/415 |
| 5,558,759 | A | | 9/1996 | Pudem ........................ 205/50 |
| 6,696,143 | B1 | | 2/2004 | La Point ..................... 428/216 |
| 2003/0079990 | A1 | | 5/2003 | Xiangdong et al. |
| 2003/0096062 | A1 | | 5/2003 | Hoberman |
| 2003/0098238 | A1 | | 5/2003 | Kulfan et al. ............... 204/471 |
| 2004/0265598 | A1 | | 12/2004 | Sanduja et al. |

FOREIGN PATENT DOCUMENTS

| | | |
|---|---|---|
| EP | 0 458 377 | 2/1997 |
| JP | 09217027 | 8/1997 |

OTHER PUBLICATIONS

Clearclad HSR Data Sheet, (Jan. 2005).
*Bulletin of Electrochemistry* 15 (5-6, May-Jun. 1999, pp. 179-182 "Clear Lacquer Coating over Gold Plated Surfaces by Electrophoretic Method for Decorative Applications" by P. Parthasarathy.

* cited by examiner

*Primary Examiner*—Roberto Rábago
(74) *Attorney, Agent, or Firm*—Diane R. Meyers

(57) ABSTRACT

An electrodepositable coating composition comprising a cationic acrylic resin derived from an epoxy function acrylic resin and an IPDI trimer and coated substrates having improved sweat resistance are disclosed. Methods for using the coatings are also disclosed.

20 Claims, No Drawings

ELECTROCOAT COMPOSITION IMPARTING SWEAT RESISTANCE AND METHODS FOR USING THE SAME

FIELD OF THE INVENTION

The present invention is directed to electrodepositable compositions and methods for using the same. More specifically, the electrodepositable compositions comprise a cationic acrylic resin and an isocyanurate trimer of isophorone diisocyanate.

BACKGROUND OF THE INVENTION

Electrodeposition as a coating application method involves deposition of a film-forming composition onto a substrate under the influence of an applied electrical potential. The substrate is either itself conductive, or has deposited thereon a conductive finish. Electrodeposition has become increasing important in the coatings industry because, by comparison with non-electrophoretic coating means, electrodeposition offers increased paint utilization, improved corrosion protection and low environmental contamination.

Conductive substrates, such as metals, and substrates coated at least in part with a conductive finish are used to make a number of products. These products can include those that are frequently touched by people, such as plumbing, door handles, and the like. For many applications, it is desired to apply a coating to these substrates that can withstand significant contact without appreciable wear, staining, and the like. Such coatings may be in the form of a pigmented coating, and/or a transparent coating. Often, however, these coatings do not exhibit a desired level of sweat resistance. As such, the coating can become marked, pitted, softened or even totally removed. Accordingly, electrodepositable coatings having improved sweat resistance are desired.

SUMMARY OF THE INVENTION

The present invention is directed to an electrodepositable coating comprising a cationic acrylic resin, and a crosslinker, wherein the crosslinker comprises greater than or equal to 35 weight percent of the coating composition, with weight percent based on total solid weight, and wherein 50 percent or greater of the crosslinker is the isocyanurate trimer of isophorone diisocyanate ("IPDI trimer").

The present invention is further directed to an electrodepositable coating composition comprising a cationic acrylic resin derived from an epoxy functional acrylic resin, wherein the cationic moiety is derived from a sulfonium salt, and an IPDI trimer.

The present invention is further directed to methods for electrocoating a substrate using any of the coating compositions described herein. The present invention is further directed to coated substrates having improved sweat resistance, wherein the coating is electrodeposited on the substrate, and has a sweat resistance of greater than or equal to two cycles, wherein sweat resistance is determined according to ANSI/BHMA A156.18-2000.

DETAILED DESCRIPTION OF THE INVENTION

The present invention is directed to an electrodepositable coating composition comprising a cationic acrylic resin and a crosslinker, wherein the crosslinker comprises greater than or equal to 35 weight percent of the coating composition, with weight percent based on total solid weight, and wherein 50 percent or greater of the crosslinker is the isocyanurate trimer of isophorone diisocyanate ("IPDI trimer"). The cationic acrylic resin can have, for example, a molecular weight (Mz) of 10,000 to 1,500,000, such as 40,000 to 1,000,000, or 80,000 to 400,000.

The cationic acrylic resin can be derived from an epoxy functional acrylic resin. An epoxy functional acrylic resin can be prepared according to any means known in the art, for example those described in U.S. Publication No. 2003/0098238 A1, the contents of which are incorporated herein by reference.

Suitable acrylic polymer used to form the cationic acrylic resin can include copolymers of one or more alkyl esters of (meth)acrylic acid optionally together with one or more other polymerizable ethylenically unsaturated monomers. Suitable alkyl esters of (meth)acrylic acid include methyl (meth)acrylate, ethyl (meth)acrylate, butyl (meth)acrylate, isobornyl (meth)acrylate and 2-ethyl hexyl (meth)acrylate. Suitable other copolymerizable ethylenically unsaturated monomers include nitriles such as (meth)acrylonitrile, vinyl and vinylidene halides such as vinyl chloride and vinylidene fluoride and vinyl esters such as vinyl acetate. Acid and anhydride functional ethylenically unsaturated monomers such as (meth)acrylic acid or anhydride, itaconic acid, maleic acid or anhydride, or fumaric acid may be used. Amide functional monomers including (meth)acrylamide and N-alkyl substituted (meth)acrylamides are also suitable. Vinyl aromatic compounds such as styrene, α-methylstyrene and vinyl toluene can be used so long as photodegradation resistance of the polymer and the resulting electrodeposited coating is not compromised. It will be understood that "(meth)acrylic" and like terms refers to both methacrylic and acrylic, as is standard in the art. Epoxide functional groups (for conversion to cationic salt groups) may be incorporated into the acrylic polymer by using functional monomers such as glycidyl (meth)acrylate, 3,4-epoxycyclohexyl-methyl(meth)acrylate, 2-(3,4-epoxycyclohexyl)ethyl(meth)acrylate, and/or allyl glycidyl ether. Alternatively, epoxide functional groups may be incorporated into the acrylic polymer by reacting carboxyl groups on the acrylic polymer with an epihalohydrin or dihalohydrin such as epichlorohydrin or dichlorohydrin.

The acrylic polymer can be prepared by traditional free radical initiated polymerization techniques, such as solution or emulsion polymerization, as known in the art, using suitable catalysts including organic peroxides and azo-type compounds and optionally chain transfer agents such as alpha-methyl styrene dimer and tertiary dodecyl mercaptan. Additional acrylic polymers that are suitable for forming the cationic resin used in the electrodepositable compositions of the present invention include those resins described in U.S. Pat. Nos. 3,455,806 and 3,928,157.

Cationic salt groups can be introduced by the reaction of an epoxy group-containing polymer of the types described above with appropriate salt forming compounds. For example, sulfonium salt groups can be introduced by reacting a sulfide in the presence of an acid, as described in U.S. Pat. Nos. 3,959,106 and 4,715,898; amine salt groups can be derived from the reaction of an epoxide functional acrylic polymer with a compound containing a primary or secondary amine group, such as methylamine, diethanolamine, ammonia, diisopropanolamine, N-methyl ethanolamine, diethylentriamine, dipropylenetriamine, bishexamethylenetriamine, the diketimine of diethylentriamine, the diketimine of dipropylenetriamine, the diketimine of bishexamethylenetriamine and mixtures thereof. The amine groups can be at least partially neutralized with an acid. Suitable acids include organic and inorganic acids such as formic acid, acetic acid, lactic acid, phosphoric acid, dimethylolpropionic acid and sulfamic acid. Mixtures of acids can be used. The resin can contain primary, secondary and/or tertiary amino groups. Suitable cationic acrylic polymers containing amino groups include those resins described in U.S. Pat. Nos. 3,455,806 and 3,928,157 and U.S. Publication No. 2003/0054193. Alternatively, amine salt groups can be introduced directly by using an amino group-containing monomer such as an aminoalkyl (meth)acrylate, for example dimethylaminopropyl methacrylate.

A "cationic acrylic resin derived from an epoxy functional acrylic resin" as that term is used herein therefore refers to an epoxy functional acrylic resin in which at least some of the epoxy functionality has been reacted so as to form a cationic salt. The cationic acrylic resin is typically present in the electrodepositable coating composition in an amount of 80 to 10 weight percent, with weight percent based on total solid weight, such as 65 to 40 weight percent.

The electrodepositable coating compositions of certain embodiments of the present invention further comprise greater than or equal to 35 weight percent of crosslinker, such as 39 weight percent of crosslinker, 50 percent or greater of which is IPDI trimer. Weight percent is based on total solid weight of the composition. The IPDI trimer can be at least partially blocked. By "blocked" is meant that the isocyanate groups have been reacted with a compound such that the resultant blocked isocyanate group is stable to active hydrogens at ambient temperature but reactive with active hydrogens at elevated temperatures usually between 90° C. and 200° C., such as 160° C. or lower or 140° C. or lower. In certain embodiments, the IPDI trimer is fully blocked with substantially no free isocyanate groups. Suitable blocking agents include those described in U.S. Pat. No. 3,984,299 at col. 2, line 53 to col. 3, line 15, U.S. Publication No. 2003/0054193A1 in paragraphs [0093], [0094], [0127] and [0128], and "Blocked isocyanates III: Part A. Mechanisms and chemistry, Wicks and Wicks Jr., Progress in Organic Coatings, 36 (1999) pp 148-172. Preferably, the blocking agent is an oxime such as methyl ethyl ketoxime, a pyrazole such as 3,5-dimethylpyrazole or a cyclic amide such as caprolactam. In certain embodiments, substantially all of the crosslinker comprises IPDI trimer; by "substantially all" is meant 95 percent or greater, such as 99 percent or greater. A suitable IPDI trimer is commercially available from Degussa as VESTANAT B1358. The remainder of the crosslinker can comprise, for example, any suitable crosslinker that is capable of reacting with the cationic acrylic resin. In certain embodiments, the remainder of the crosslinker comprises an at least partially blocked polyisocyanate, such as an aliphatic polyisocyanate, an araliphatic or an aromatic polyisocyanate, or a mixture of these. In certain embodiments, the remainder of the crosslinker comprises an at least partially blocked aliphatic polyisocyanate.

Examples of aromatic polyisocyanates suitable for use as curing agents are diisocyanates such as 2,4-toluene diisocyanate, 2,6-toluene diisocyanate, methylene diphenyl diisocyanate, oligomeric methylene diphenyl diisocyanate, and mixtures thereof. Examples of araliphatic and aliphatic polyisocyanates suitable for use as curing agents include diisocyanates such as 1,6-hexamethylene diisocyanate, isophorone diisocyanate, bis-(isocyanatocyclohexyl)methane, norbornane diisocyanate, tetramethyl xylene diisocyanate and mixtures thereof. In certain embodiments, higher polyisocyanates, such as isocyanurates, allophonates or biurets or diisocyanates, can be used in lieu of or in combination with diisocyanates. Isocyanate prepolymers, for example, reaction products of polyisocyanates with polyols such as neopentyl glycol or trimethylol propane or with polymeric polyols such as polycaprolactone diols or triols can be used. Suitable polyisocyanates include, for example, fully blocked polyisocyanates, such as those described in U.S. Pat. No. 3,984,299 at col. 1, line 57 to col. 3, line 15, or partially blocked aliphatic polyisocyanates that are reacted with the polymer backbone, such as is described in U.S. Pat. No. 3,947,338 at col. 2, line 65 to col. 4, line 30. In certain embodiments of the present invention, the remainder of the crosslinker can comprise a fully blocked polyisocyanate selected from a polymeric 1,6-hexamethylene diisocyanate, isophorone diisocyanate, and mixtures thereof. In other embodiments of the present invention, the remainder of the crosslinker can comprise a fully blocked trimer of hexamethylene diisocyanate, available as DESMODUR N3300 from Bayer Corporation.

The present invention is further directed to an electrodepositable coating composition comprising a cationic acrylic resin derived from an epoxy functional acrylic resin, wherein the cationic moiety is derived from a sulfonium salt, and an IPDI trimer. In certain embodiments, the IPDI trimer can be present in amounts of 20 weight percent or greater, such as 30 percent or greater or 39 weight percent or greater, with weight percent based on total solid weight of the composition.

It will be appreciated that in formulating the electrodepositable coating compositions of the present invention, the IPDI trimer will be at least partially blocked with a suitable blocking agent, for example, an alkyl alcohol, an oxime, a glycol ether, a caprolactam, or a dialkylamine. Thus, the IPDI trimer can be incorporated into the coating composition in a conventional manner, for example by admixing the curing agent with the cationic acrylic resin in organic solution, then dispersing the mixture. The dispersing medium is preferably water. The dispersion step may be accomplished by combining the neutralized or partially neutralized resin with the dispersing medium. Neutralization and dispersion can be accomplished in one step by combining the resin and the dispersing medium. The resin (or its salt) can be added to the dispersing medium or the dispersing medium can added to the resin (or its salt). In certain embodiments, the pH of the dispersion is within the range of 4 to 9. The dispersion can be formed at a suitable solids for coating, for example 5 to 15 weight percent, based on total solid weight, or it can be formed at a higher solids, for example 20 to 45 weight percent, based on total solid weight, to minimize the weight and volume of material that needs to be stored and transported. The dispersion can then be adjusted to a suitable solids level for coating prior to use. Alternatively, the resin, optionally blended with the crosslinker, can be stored and transported as an organic solution and dispersed shortly before use. Suitable conditions for forming such stable dispersions include those set forth in the Examples.

The compositions of the present invention can further comprise one or more polymers, polyurethane polymers acrylic polymers and polyester polymers. The polymers can optionally contain cationic groups. The additional polymers can be present at 0 to 20 weight percent based on resin solids, for example 2 to 15 weight percent or 4 to 8 weight percent. One particularly useful class of additional resin is cationic epoxy resins, for example those described in U.S. Pat. No. 4,715,898.

The compositions of the present invention may further comprise one or more additives standard in the art, such as coalescencing solvents, plasticizers, dispersing agents, wetting agents, light stabilizers, surfactants, and catalysts. Such additives, if used, will typically comprise 0.001 to 5 weight percent, based on the total solid weight of the composition.

In certain embodiments the compositions of the present invention are transparent. "Transparent", as used herein, refers to a coating that, once cured, allows visibility of the substrate. Thus, it will be appreciated that transparent encompasses both clear coatings as well as coatings that may comprise, for example, transparent dye, wherein the coating would be colored, but the substrate could be observed. In certain embodiments of the present invention, the coatings further comprise a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coating of the present invention.

Example colorants include pigments, dyes and tints, such as those used in the paint industry and/or listed in the Dry Color Manufacturers Association (DCMA) as well as special effect compositions. A colorant may include, for example, a finely divided solid powder that is insoluble but wettable under the conditions of use. A colorant can be organic or inorganic and can be agglomerated or non-agglomerated.

Example pigments and/or pigment compositions include, but are not limited to, carbazole dioxazine crude pigment, azo, monoazo, disazo, naphthol AS, salt-type (likes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DP-PBO red"), titanium dioxide, carbon black and mixtures thereof. The terms "pigment" and "colored filler" can be used interchangeably.

Example dyes includes, but are not limited to, those that are solvent and/or aqueous-based such as pthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions, division of Eastman Chemical, Inc.

As noted above, the colorant can be in the form of a dispersion including, but not limited to, a nanoparticle dispersion. Nanoparticle dispersions can include one or more highly dispersed nanoparticle colorants or colorant particles that produce a desired visible color and/or opacity and/or visual effect. Nanoparticle dispersions can include colorants such as pigments or dyes having a particle size of less than about 150 nm, such as less than 70 nm, or less than 30 nm. Nanoparticles can be produced by milling stock organic or inorganic pigments with grinding media having a particle size of less than 0.5 mm. Example nanoparticle dispersions and method for making them are identified in U.S. Publication No. 2003/0125417, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discrete "composite microparticles" that comprise a nanoparticle and a resin coating on the nanoparticle. Example dispersions of resin-coated nanoparticles and methods for making them are identified in U.S. application Ser. No. 10/876,315 filed Jun. 24, 2004 now U.S. Pat. No. 7,438,972, which is incorporated herein by reference, and U.S. Provisional Application No. 60/482,167 filed Jun. 24, 2003, which is also incorporated herein by reference.

Example special effect compositions that may be used in the coating of the present invention include pigments and/or compositions that produce one or more appearance effects such as reflectance, pearlescence, metallic sheen, phosphorescene, fluorescene, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Publication No. 2003/0125416, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/ or at least partially bound to a polymer and/or polymerizable component in accordance with a non-limiting embodiment of the present invention have minimal migration out of the coating. Example photosensitive compositions and/or photochromic compositions and methods for making them are identified in U.S. application Ser. No. 10/892,919 filed Jul. 16, 2004 and incorporated herein by reference.

In general, the colorant can be present in the coating composition in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

The electrodepositable coating compositions of the present invention will typically be in the form of an aqueous dispersion, that is, the resin and crosslinker are in the dispersed phase and the water is in the continuous phase.

In certain embodiments, the coating compositions of the present invention will have a sweat resistance of one cycle or greater, such as two cycles or greater, with sweat resistance measured according to ANSI/BHMA A156.18-2000.

The present invention is further directed to methods for electrocoating a substrate, comprising applying to the substrate any of the coating compositions described herein. Because electrodeposition requires conductivity, the substrate must either itself be conductive, or have applied thereto, at least partially, a conductive finish. For example, the conductive substrate can be any form of metal, such as brass, bronze, chrome, steel, stainless steel, silver, and/or aluminum. Nonmetallic substrates can include, for example, plastics, ceramics, wood, and/or glass, that have been coated, at least in part with a conductive finish. A conductive finish can include, for example, metallic finishes, or finishes achieved using any coating having conductive pigments or conductive metallic fragments.

Any suitable electrocoating method can be used according to the present invention, such as any of those well known in the art. Similarly, cure of the electrodeposited coating can be conducted using cure parameters known in the art. The dry film thickness of the cured coating can range, for example, from 0.2 to 2 microns, such as 0.4 to 1.2 microns.

The present invention is further directed to coated substrates having improved sweat resistance. Such substrates can be prepared by electrodepositing on the substrate a coating having a sweat resistance of greater than or equal to two cycles, with sweat resistance measured according to ANSI/BHMA A156.18-2000. Again, because of electrodeposition is used, it will be understood that the substrate is either conductive or has applied to at least a portion thereof a conductive finish. Any of the compositions described herein meeting the sweat resistance parameter can be used.

The compositions and methods of the present invention can result in a substrate that has, for example, a sweat resistance pigmented coat and/or transparent coat.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa. For example, while the invention has been described in terms of "a" cationic acrylic resin derived from an epoxy functional acrylic resin, a mixture of such resins can be used. Also, as used herein, the term "polymer" is meant to refer to prepolymers, oligomers and both homopolymers and copolymers; the prefix "poly" refers to two or more.

EXAMPLES

The following examples are intended to illustrate the invention, and should not be construed as limiting the invention in any way.

Example 1

Samples 1-19 were prepared using the ingredients set forth in Table 1, which gives the mass of each ingredient in grams.

TABLE 1

| | | Sample 1 | Sample 2 | Sample 3 | Sample 4 | Sample 5 | Sample 6 | Sample 7 | Sample 8 | Sample 9 | Sample 10 |
|---|---|---|---|---|---|---|---|---|---|---|---|
| A | DOWANOL PNB[1] | 44.0 | 44.0 | 44.0 | 44.0 | | 92.1 | 44.0 | 79.1 | 44.0 | 39.6 |
| | DOWANOL PM[2] | 24.0 | 24.0 | 24.0 | 24.0 | | 50.3 | 24.0 | 43.2 | 24.0 | 21.6 |
| | Hexyl Cellosolve[3] | | | | | 190.1 | | | | | |
| | TINUVIN 1130[4] | 3.5 | 3.5 | 3.5 | 3.5 | 3.5 | 7.3 | 3.5 | 6.3 | 3.5 | 3.1 |
| B | butyl acrylate | 46.9 | 46.9 | 46.9 | 46.9 | 46.9 | 98.2 | 46.9 | 84.3 | 46.9 | 42.2 |
| | hydroxypropyl methacrylate | 15.6 | 15.6 | 15.6 | 15.6 | 15.6 | 32.7 | 15.6 | 28.1 | 15.6 | 14.0 |
| | LUPERSOL 555[5] | 0.52 | 0.52 | 0.52 | 0.52 | 0.52 | 1.10 | 0.52 | 1.0 | 0.52 | 0.5 |
| C | Butyl acrylate | 190.6 | 190.6 | 190.6 | 34.4 | 190.6 | 399.1 | 190.6 | 342.76 | 190.6 | 171.4 |
| | Hydroxypropyl methacrylate | 78.1 | 78.1 | 78.1 | 84.4 | 78.1 | 163.6 | 78.1 | 140.4 | 78.1 | 70.2 |
| | Methyl methacrylate | 218.7 | 218.7 | 225.0 | 212.5 | 225.0 | 458.0 | 93.8 | 224.7 | 125.0 | 112.4 |
| | styrene | | | | 156.2 | | | 125.0 | 168.6 | 93.7 | 84.3 |
| | Glycidyl methacrylate | 75.0 | 75.0 | 68.7 | 75.0 | 68.7 | 157.1 | 75.0 | 134.9 | 75.0 | 67.4 |
| | α-methylstyrene dimer | 5.1 | 5.1 | 5.1 | 5.1 | 5.1 | 10.7 | 5.1 | 9.2 | 5.1 | 4.6 |
| | LUPERSOL 555 | 13.5 | 13.5 | 13.5 | 13.5 | 13.5 | 28.3 | 13.5 | 24.3 | 13.5 | 12.1 |
| | DOWANOL PNB | 20.0 | 20.0 | 20.0 | 20.0 | | 41.9 | 20.0 | 36.0 | 20.0 | 18.0 |
| | DOWANOL PM | 10.0 | 10.0 | 10.0 | 10.0 | | 20.9 | 10.0 | 18.0 | 10.0 | 9.0 |
| | Hexyl Cellosolve | | | | | 30.0 | | | | | |
| D | LUPERSOL 555 | 8.8 | 8.8 | 8.8 | 8.8 | 8.8 | 18.4 | 8.8 | 8.8 | 8.8 | 7.9 |
| | DOWANOL PNB | 10.0 | 10.0 | 10.0 | 10.0 | | 20.9 | 10.0 | 10.0 | 10.0 | 9.0 |
| | DOWANOL PM | 5.0 | 5.0 | 5.0 | 5.0 | | 10.5 | 5.0 | 5.0 | 5.0 | 24.3 |
| | Hexyl Cellosolve | | | | | 15.0 | | | | | |
| E | thiodiethanol | 122.1 | 122.1 | 111.8 | 122.1 | | 255.7 | 122.1 | 219.6 | 122.1 | 109.8 |
| | PURAC HS 50[6] | 63.0 | 63.0 | | | | 131.9 | 63.0 | 113.3 | 63.0 | 56.6 |
| | 12-hydroxystearic acid | 15.0 | 15.0 | 13.7 | 15.0 | | 31.4 | 15.0 | 27.— | 15.0 | 13.5 |
| | deionized water | 27.0 | 27.0 | 24.7 | 27.0 | | 56.5 | 27.0 | 48.6 | 27.0 | 24.3 |
| | PURAC HS 88[7] | | | 32.8 | 35.8 | | | | | | |
| | n-methyl ethanolamine | | | | | 30.9 | | | | | |
| F | DOWANOL PM | 37.1 | 37.1 | 41.9 | | | 77.7 | 37.1 | 66.7 | 37.1 | 33.4 |
| | DOWANOL PPH[8] | 85.0 | 85.0 | 85.0 | 85.0 | | 178.0 | 85.0 | 152.8 | 85.0 | 76.4 |
| | dibutyltin diacetate | 6.7 | 6.7 | 6.7 | 6.7 | | 14.0 | | | | |
| | plasticizer[9] | 14.8 | 14.8 | 14.8 | 14.8 | 14.8 | 31.0 | 14.8 | 26.6 | 14.8 | 13.3 |
| G | VESTANAT B-1358-100[10] | 580.8 | 425.0 | 344.0 | | 548.0 | 1216.0 | 580.8 | 1044.4 | | 522.2 |
| | Crosslinker[11] | | | | 806.0 | | | | | | |
| | Crosslinker[13] | | | | | | | | | 1027.0 | |
| H | DOWANOL PM | 54.0 | 54.0 | 34.8 | | | 113.1 | 54.0 | 97.1 | | 48.6 |
| | Hexyl Cellosolve | | | | | 54.0 | | | | | |
| | dibutyltin diacetate | | | | | 6.7 | | 6.7 | 12.0 | 6.7 | 6.0 |
| | PURAC HS 50 | | | | | 44.5 | | | | | |
| I | Cationic epoxy resin 1[12] | 258.8 | 258.8 | 258.8 | 258.8 | 258.8 | 541.9 | | 465.0 | 258.5 | |
| | Cationic epoxy resin 2[14] | | | | | | | | | | 258.5 |
| | deionized water | 1490.0 | 1490.0 | 1113.3 | 1399.1 | 1342.3 | 3120.1 | 1414.8 | 2451.2 | 1216.0 | 1199.8 |
| J | deionized water | 850.8 | 534.5 | 777.7 | 900.0 | 918.8 | 1791.0 | 2024.1 | 1758.3 | 715.4 | 879.2 |

TABLE 1-continued

|   |   | Sample 11 | Sample 12 | Sample 13 | Sample 14 | Sample 15 | Sample 16 | Sample 17 | Sample 18 | Sample 19 |
|---|---|---|---|---|---|---|---|---|---|---|
| A | DOWANOL PNB | 79.1 | 39.6 | 54.3 | 78.3 | 39.1 | 85.4 | 85.4 | 195.6 | 85.4 |
|   | DOWANOL PM | 43.2 | 21.6 | 29.6 | 42.7 | 21.4 | 46.6 | 46.6 | 106.7 | 46.6 |
|   | Hexyl Cellosolve |   |   |   |   |   |   |   |   |   |
|   | TINUVIN 1130 | 6.3 | 3.1 | 4.3 | 6.2 | 3.1 | 6.8 | 6.8 | 15.6 | 6.8 |
| B | ethyl acrylate |   |   |   |   |   | 91.0 | 91.0 | 208.4 | 91.0 |
|   | butyl acrylate | 84.3 | 42.2 | 57.9 | 83.4 | 41.7 |   |   |   |   |
|   | Hydroxypropyl methacrylate | 28.1 | 14.0 | 19.3 | 27.8 | 13.9 | 15.2 |   |   | 10.1 |
|   | 4-hydroxybutyl acrylate |   |   |   |   |   | 15.2 | 30.4 | 69.4 | 20.3 |
|   | LUPERSOL 555 | 1.0 | 0.5 | 0.60 | 0.9 | 0.5 |   | 1.01 | 2.40 | 1.01 |
|   | VAZO 67[15] |   |   |   |   |   | 3.0 |   |   |   |
| C | Butyl acrylate | 342.7 | 171.4 | 235.3 | 339.1 | 169.6 |   |   |   |   |
|   | ethyl acrylate |   |   |   |   |   | 430.9 | 430.1 | 986.4 | 515.8 |
|   | Hydroxypropyl methacrylate | 140.4 | 70.2 | 96.4 | 138.9 | 69.5 | 75.9 |   |   | 50.6 |
|   | 4-hydroxybutyl acrylate |   |   |   |   |   | 75.9 | 151.7 | 347.3 | 101.1 |
|   | Methyl methacrylate | 224.7 | 112.4 | 100.3 | 211.2 | 105.6 | 182.0 | 182.1 | 416.8 | 169.9 |
|   | styrene | 168.6 | 84.3 | 154.3 | 166.8 | 83.4 | 182.1 | 182.1 | 416.8 | 121.4 |
|   | Glycidyl methacrylate | 134.9 | 67.4 | 108.0 | 144.5 | 72.3 | 145.7 | 145.7 | 333.5 | 133.5 |
|   | α-methylstyrene dimer | 9.2 | 4.6 | 6.3 | 9.1 | 4.5 |   | 10.0 | 22.7 | 10.0 |
|   | t-dodecylmercaptan |   |   |   |   |   | 10.9 |   |   |   |
|   | LUPERSOL 555 | 24.3 | 12.1 | 16.7 | 24.0 | 12.0 |   | 26.3 | 60.0 | 26.3 |
|   | VAZO 67 |   |   |   |   |   | 27.3 |   |   |   |
|   | DOWANOL PNB | 36.0 | 18.0 | 24.7 | 35.6 | 17.8 | 38.9 | 38.9 | 88.9 | 38.9 |
|   | DOWANOL PM | 18.0 | 9.0 | 12.3 | 17.8 | 8.9 | 19.4 | 19.4 | 44.5 | 19.4 |
|   | Hexyl Cellosolve |   |   |   |   |   |   |   |   |   |
| D | LUPERSOL 555 | 15.8 | 7.9 | 10.9 | 15.7 | 7.8 |   | 17.2 | 39.4 | 17.2 |
|   | LUPERSOL 75M |   |   |   |   |   | 24.2 |   |   |   |
|   | DOWANOL PNB | 18.0 | 9.0 | 12.3 | 17.8 | 8.9 | 19.4 | 19.4 | 44.5 | 19.4 |
|   | DOWANOL PM | 9.0 | 4.5 | 6.2 | 8.9 | 4.4 | 9.8 | 9.8 | 22.2 | 9.8 |
|   | Hexyl Cellosolve |   |   |   |   |   |   |   |   |   |
| E | thiodiethanol | 219.6 | 109.8 | 175.8 | 235.5 | 117.8 | 237.1 | 2237.1 | 542.9 | 217.3 |
|   | PURAC HS 50 | 113.3 | 56.6 | 90.7 | 121.4 | 60.7 | 122.4 | 122.4 | 280.1 | 112.1 |
|   | 12-hydroxystearic acid | 27.0 | 13.5 | 21.4 | 28.9 | 14.5 | 29.1 | 29.1 | 66.7 | 26.5 |
|   | deionized water | 48.6 | 24.3 | 38.8 | 52.0 | 26.0 | 52.4 | 52.4 | 120.1 | 48.1 |
|   | PURAC HS 88 |   |   |   |   |   |   |   |   |   |
|   | n-methyl ethanolamine |   |   |   |   |   |   |   |   |   |
| F | DOWANOL PM | 66.7 | 33.4 | 45.8 | 66.0 | 33.0 | 72.1 | 72.1 | 165.0 | 72.1 |
|   | DOWANOL PPH | 152.8 | 76.4 | 104.9 | 151.2 | 75.6 | 165.1 | 165.1 | 378.0 | 165.1 |
|   | dibutyltin diacetate |   |   |   |   |   |   |   |   |   |
|   | plasticizer | 26.6 | 13.3 | 18.3 | 26.3 | 13.2 | 28.8 | 28.8 | 65.8 | 28.8 |
| G | VESTANAT B-1358-100 | 1044.4 | 522.2 | 717.0 | 1033.3 | 516.7 | 1128.9 | 1128.9 | 2582.6 | 1128.9 |
| H | DOWANOL PM | 97.1 | 48.6 | 66.7 | 96.1 | 48.0 | 104.9 | 104.9 | 240.1 | 105.0 |
|   | Hexyl Cellosolve |   |   |   |   |   | 282.1 | 282.1 |   |   |
|   | butyl cellosolve |   |   |   |   |   | 141.1 | 141.1 |   |   |
|   | butyl carbitol |   |   |   |   |   | 141.1 | 141.1 |   |   |
|   | dibutyltin diacetate | 12.0 | 6.0 | 8.3 | 11.9 | 6.0 | 13.1 | 13.1 | 29.8 | 13.1 |
|   | PURAC HS 50 |   |   |   |   |   |   |   |   |   |
| I | Cationic epoxy resin 1 |   |   |   |   |   |   |   |   |   |
|   | Cationic epoxy resin 2 | 516.7 | 552.9 | 354.6 | 508.5 | 543.2 | 557.9 | 557.9 | 1257.3 | 546.0 |
|   | deionized water | 2399.5 | 1117.3 | 2007.3 | 2401.8 | 1120.0 | 2057.0 | 2027.7 | 5938.8 | 2591.5 |
| J | deionized water | 1758.3 | 940.2 | 867.4 | 1756.6 | 938.2 | 1911.1 | 1899.3 | 4343.6 | 1885.2 |

[1] n-butoxypropanol available from Dow Chemical Co.
[2] 1-methoxy-2-propanol available from Dow Chemical Co.
[3] ethyleneglycol monohexyl ether available from Dow Chemical Co.
[4] Light stabilizer available from Ciba Geigy Corporation.
[5] t-amyl peroxyacetate available from Arkema.
[6] 50% aqueous lactic acid available from Purac America Inc.
[7] 88% aqueous lactic acid available from Purac America Inc.
[8] propyleneglycol monophenyl ether available from Dow Chemical Co.
[9] Reaction product of paraformaldehyde (9% by weight) and diethylene glycol monobutyl ether (91% by weight) prepared as described in EP 339 795.
[10] Oxime blocked IPDI isocyanurate trimer available from Degussa AG.
[11] Blocked isocyanate crosslinker, 70% solids by weight in DOWANOL PM, DOWANOL PPh and methyl n-propyl ketone (2:2:1 by weight) - prepared by reacting isophorone diisocyanate (61.1 parts by weight) with trimethylol propane (9.86 parts by weight) followed by reaction of the remaining isocyanate groups with methylethyl ketoxime (24.0 parts by weight). (This product is not an isocyanurate trimer.)
[12] Prepared as described in U.S. Pat. No. 4,715,898, Example 4 except that 2.87 equivalents of EPON 828, 1.87 equivalents of Bisphenol A and no nonyl phenol were used. Sufficient deionized water was added to reduce the solids content to 34.1%.
[13] Blocked isocyanate crosslinker, 53% solids by weight in DOWANOL PM, DOWANOL PPh and methyl n-propyl ketone (4.7:3.4:1.9 by weight) - prepared by reacting isophorone diisocyanate (62.8 parts by weight) with trimethylol propane (12.6 parts by weight) followed by reaction of the remaining isocyanate groups with methylethyl ketoxime (24.6 parts by weight). (This product is not an isocyanurate trimer.)
[14] Prepared as described in U.S. Pat. No. 4,715,898, Example 4, except that the propylene glycol monobutyl ether was replaced with a 4:1 by weight mixture of propylene glycol butyl ether and propylene glycol methyl ether and that sufficient deionized water was added to reduce the solids content to 30.6%.
[15] 2,2'-azobis(2-methylbutyronitrile) available from E. I. DuPont de Nemours & Co.

Resin Samples 1-6 and 8-19 were prepared as follows: Components A were charged to a flask fitted with a nitrogen inlet, stirrer, condenser and thermocouple. The temperature was increased until reflux began. Components B were then added at a uniform rate over 30 minutes. After a further 30 minutes, Components C were added at a uniform rate over 150 minutes. Thirty minutes later, 50% of Components C were added over about 5 minutes. The remainder of Components C were added over about 5 minutes, 30 minutes later. Through these stages of the reaction, the temperature was adjusted in order to maintain a constant reflux.

The heat source was removed and the temperature was allowed to drop to about 120° C. and the thiodiethanol from Components E was added. Once the temperature was below 100° C. the remainder of Components E were added. The heat source was then replaced and the temperature was adjusted to 85° C. This temperature was maintained for 3½ hours. Components F and G were then added and the temperature raised back to 85° C. Once a homogeneous solution of resin and crosslinker had been achieved, Components H were then added and stirring was continued for a further 20 minutes.

In a separate vessel, Components I were heated to 40° C. The resin and crosslinker solution were then added under rapid agitation. One hour later, Component J was added. The resin dispersion was allowed to cool to below 30° C. before stirring was stopped. The solids content of the dispersions are given in Table 2.

Sample 7 was prepared as follows:

Components A were charged to a flask fitted with a nitrogen inlet, stirrer, condenser and thermocouple. The temperature was increased until reflux began. Components B were then added at a uniform rate over 30 minutes. After a further 30 minutes, Components C were added at a uniform rate over 150 minutes. Thirty minutes later, 50% of Components C were added over about 5 minutes. The remainder of Components C were added over about 5 minutes 30 minutes later. Through these stages of the reaction, the temperature was adjusted in order to maintain a constant reflux.

The heat source was removed and the temperature was allowed to drop to about 110° C. and Components E were added. The temperature increased to 120° C. due to the exothermic reaction. The heat source was then replaced and the temperature was maintained at 120° C. for 90 minutes. The temperature was then reduced to 90° C. and Components F and G were then added and the temperature adjusted to 85° C. Once a homogeneous solution of resin and crosslinker had been achieved, Components H were then added and stirring was continued for a further 20 minutes.

In a separate vessel, Components I were heated to 40° C. The resin and crosslinker solution were then added under rapid agitation. One hour later, Component J was added. The resin dispersion was allowed to cool to below 30° C. before stirring was stopped.

Example 2

Electrodepositable coatings 1-19 were prepared using Resin Samples 1-19, respectively. The coatings were prepared by one of the following methods as indicated in Table 2.

Method 1. A resin dispersion prepared at 23-40% non-volatiles by weight was charged to a plastic beaker and agitation was commenced using an high-lift blade. A solvent blend comprised of 25-100% 2-hexoxy ethanol, 25-100% 2-butoxy ethanol, and 25-100% 2-butoxyethoxy ethanol at a level of 5-20% on resin solids was then added while agitation with the high-lift blade continued. After 5 minutes of stirring, deionized water was then added slowly to the mixture under continued agitation. Diluting the dispersion with deionized water to 10-15% non-volatile material by weight yielded a coating bath with viscosity less than 50 cps, pH of 4.2-4.9, and conductivity of 300 to 500 microsiemens. The 10-15% solids bath exhibited no visual signs of particle flocculation or agglomeration.

Method 2. A resin dispersion prepared at 23-40% non-volatiles by weight, was charged to a plastic beaker and agitation was commenced using an high-lift blade. Deionized water was then added slowly under continued agitation. Diluting the dispersion with deionized water to 10-15% non-volatile material by weight yielded a coating bath with viscosity less than 50 cps, pH of 4.2-4.9, and conductivity of 300 to 500 microsiemens. The 10-15% solids bath exhibited no visual signs of particle flocculation or agglomeration.

Method 3. A resin dispersion prepared at 23-40% non-volatiles by weight was charged to a plastic beaker and agitation was commenced using an high-lift blade. The dispersion was diluted with deionized water to 10-15% non-volatile material by weight. Subsequent addition of an epoxy resin dispersion* in the amount of 5-10% non-volatile material by weight on resin solids followed by addition of 2-butoxy ethanol or 2-hexoxy ethanol or 2-butoxyethoxy ethanol or 2-butoxy-1-propanol in the amount of 5-20% on resin solids to the existing paint bath yielded a coating bath with viscosity less than 50 cps, pH of 4.2-4.9, and conductivity of 300 to 500 microsiemens. The bath exhibited no visual signs of particle flocculation or agglomeration. (*Prepared as described in U.S. Pat. No. 4,715,898, Example 4, except that the propylene glycol monobutyl ether was replaced with a 4:1 by weight mixture of propylene glycol butyl ether and propylene glycol methyl ether and that sufficient deionized water was added to reduce the solids content to 30.6%.)

Method 4. A dispersion prepared at 10-15% non-volatile material by weight according to method 2 was stirred with a high-lift blade. Continuing agitation with a high-lift blade, subsequent addition of 2-butoxy ethanol or 2-hexoxy ethanol or 2-butoxyethoxy ethanol or 2-butoxy-1-propanol (or monoalkyl or monoaryl-substituted EG, DEG, PG, or DPG ethers) in the amount of 5-20% on resin solids to the existing paint bath yielded a coating bath with viscosity less than 50 cps, pH of 4.2-4.9, and conductivity of 300 to 500 microsiemens. The bath exhibited no visual signs of particle flocculation or agglomeration.

TABLE 2

| Coating Composition | Resin sample | Resin sample solids | Coating composition method | Molecular weight Mw | Molecular weight Mz | PSz** | Monomer Composition BA | EA | St | MMa | HPMa | HBa | GMa | Crosslinker Type | Wt. % | DFT* | Sweat Resistance |
|---|---|---|---|---|---|---|---|---|---|---|---|---|---|---|---|---|---|
| 1 | 1 | 31.0 | 2 | 19076 | 71194 | 1066 | 38 | | | 35 | 15 | | 12 | Vest B-1358 | 40.2 | 0.75 | 4 |
| | | | | | | | | | | | | | | | | 0.57 | 3 |

TABLE 2-continued

| Coating Composition | Resin sample | Resin solids | Coating composition method | Molecular weight Mw | Mz | PSz** | BA | EA | St | MMa | HPMa | HBa | GMa | Crosslinker Type | Wt. % | DFT* | Sweat Resistance |
|---|---|---|---|---|---|---|---|---|---|---|---|---|---|---|---|---|---|
| 2 | 2 | 31.4 | 2 | 19842 | 75339 | 899 | 38 | | | 35 | 15 | | 12 | Vest B-1358 | 33 | 0.70 | 1 |
| | | | | | | | | | | | | | | | | 0.53 | 0 |
| 3 | 3 | 31.7 | 2 | 19361 | 62728 | 820 | 38 | | | 36 | 15 | | 11 | Vest B-1358 | 28.7 | 0.79 | 0 |
| 4 | 4 | 37.3 | 2 | 14219 | 53261 | 3190 | 13 | | 25 | 34 | 16 | | 12 | Crosslinker[11] | 38.6 | 0.66 | 0 |
| 5 | 5 | 32.1 | 4 | 20710 | 92702 | 695 | 38 | | | 36 | 15 | | 12 | Vest B-1358 | 40.4 | 0.65 | 2 |
| 6 | 6 | 31.7 | 4 | 16653 | 57497 | 870 | 38 | | | 35 | 15 | | 12 | Vest B-1358 | 40.2 | 0.75 | 4 |
| 7 | 7 | 24.0 | 3 | 25299 | 89920 | 8880 | 38 | | 20 | 15 | 15 | | 12 | Vest B-1358 | 42.8 | 0.65 | 5 |
| 8 | 8 | 31.6 | 2 | 18050 | 62195 | 2010 | 38 | | 15 | 20 | 15 | | 12 | Vest B-1358 | 40.2 | 0.65 | 5 |
| 9 | 9 | 31.7 | 2 | 16470 | 68138 | 2560 | 38 | | 15 | 20 | 15 | | 12 | Crosslinker[13] | 40 | 0.66 | 1 |
| | | | | | | | | | | | | | | | | 0.61 | 0 |
| 10 | 10 | 32.0 | 3 | 17764 | 60719 | 3760 | 38 | | 15 | 20 | 15 | | 12 | Vest B-1358 | 40.2 | 0.68 | 5/6 |
| 11 | 11 | 32.1 | 1 | 15903 | 48042 | 3430 | 38 | | 15 | 20 | 15 | | 12 | Vest B-1358 | 40.2 | 0.39 | 3 |
| | | | | | | | | | | | | | | | | 0.15 | 3 |
| 12 | 12 | 31.9 | 1 | 15100 | 52281 | 1930 | 38 | | 15 | 20 | 15 | | 12 | Vest B-1358 | 40.2 | 0.74 | 4 |
| 13 | 13 | 31.6 | 1 | 22461 | 89314 | 719 | 38 | | 20 | 13 | 15 | | 14 | Vest B-1358 | 39.7 | 0.74 | 4 |
| 14 | 14 | 32.9 | 1 | 17404 | 67927 | 1098 | 38 | | 15 | 19 | 15 | | 13 | Vest B-1358 | 40 | 0.6 | 4 |
| 15 | 15 | 33.0 | 1 | 15992 | 69197 | 973 | 38 | | 15 | 19 | 15 | | 13 | Vest B-1358 | 40 | 0.64 | 3 |
| 16 | 16 | 32.3 | 2 | 23224 | 99127 | 1462 | | 43 | 15 | 15 | 7.5 | 7.5 | 12 | Vest B-1358 | 40 | 0.59 | 8 |
| 17 | 17 | 33.4 | 1 | 64615 | 341576 | 1540 | | 43 | 15 | 15 | | 15 | 12 | Vest B-1358 | 40 | 0.55 | 6 |
| | | | | | | | | | | | | | | | | 0.79 | 6 |
| 18 | 18 | 34.5 | 1 | 52856 | 298731 | 716 | | 43 | 15 | 15 | | 15 | 12 | Vest B-1358 | 40 | 0.51 | 6 |
| | | | | | | | | | | | | | | | | 0.82 | 7 |
| 19 | 19 | 31.0 | 1 | 71291 | 391802 | 783 | | 50 | 10 | 14 | 5 | 10 | 11 | Vest B-1358 | 40 | 0.67 | 4 |
| | | | | | | | | | | | | | | | | 0.85 | 5 |

*dry film thickness - mils,
**Particle size - Angstroms

Example 3

| Step | Material | Concentration | Time |
|---|---|---|---|
| Ultrasonic cleaning | ULTRASOAK 127[16] | 5% by vol in D.I. water | 120 seconds |
| Rinse | Deionized water | | 30 seconds |
| Anodic cleaning | Cleaner CB141 CBS[17] | 6 V, 50 A/ft² 5% by weight in D.I. water | 60 seconds |
| Rinse | Deionized water | | 30 seconds |
| Acid cleaning | Sulfuric Acid[18] | 5% by vol in D.I. water | 30 seconds |
| Rinse | Deionized water | | 30 seconds |

[16]Commercially available from Hubbard Hall Inc., 563 South Leonard Street, Waterbury, Connecticut 06708.
[17]Commercially available from Hubbard Hall Inc., 563 South Leonard Street, Waterbury, Connecticut 06708.
[18]Commercially available from Fisher Scientific, Pittsburgh, Pennsylvania 15275.

Polished yellow brass (CDA 260) obtained from McMurray Metals of 3000 Elm Street, Dallas, Tex 75226 was first prepared according to Table 3, then electrophoretically coated with the cationic paint of Table 2 using a bath temperature of 80° F., voltage of 30-125V, over a duration of 15-60 seconds. The coated panel was then rinsed with deionized water and cured by heating in an electric oven at 320° F. for 30 minutes to crosslink the polymer coating. Dry film thicknesses of 0.40-1.20 mils for the cured panels were measured using a Fisherscope MMS instrument. The coatings were visually smooth, clear, and had high gloss and distinctness of image.

The electrophoretically-coated and cured panels were then subjected to perspiration resistance testing as described in ANSI/BHMA A156.18-2000, American National Standard for Materials and Finishes, available from the American National Standard Institute, New York. The results of this testing are given in Table 2. Comparative panels prepared and coated with ClearClad HSR, available from LVH Coatings, Birmingham B46 1HT England, did not pass one cycle of the perspiration resistance test.

Whereas particular embodiments of this invention have been described above for purposes of illustration, it will be evident to those skilled in the art that numerous variations of the details of the present invention may be made without departing from the invention as defined in the appended claims.

What is claimed is:

1. An electrodepositable coating composition comprising:
   a) a cationic acrylic resin derived from an epoxy functional acrylic resin; and
   b) greater than or equal to 35 weight percent crosslinker, wherein 50 percent or greater of the crosslinker is the isocyanurate trimer of isophorone diisocyanate,
   wherein weight percent is based on total solid weight of the coating composition.

2. The coating composition of claim 1, wherein the cationic moiety is derived from a sulfonium salt.

3. The coating composition of claim 1, wherein substantially all of the crosslinker is the isocyanurate trimer of isophorone diisocyanate.

4. The coating composition of claim 1, wherein said coating is not transparent.

5. The coating composition of claim 1, wherein said coating is transparent.

6. The coating composition of claim 1, wherein said cationic acrylic resin comprises styrene moieties.

7. The coating composition of claim 1, wherein said acrylic resin comprises ethyl acrylate moieties.

8. The coating composition of claim 1, wherein said acrylic resin comprises 4-hydroxybutyl acrylate moieties.

9. An electrodepositable coating composition comprising:
   a) a cationic acrylic resin derived from an epoxy functional acrylic resin,
   wherein the cationic moiety is derived from sulfonium salt; and
   b) the isocyanurate trimer of isophorone diisocyanate.

10. The coating composition of claim 9, wherein the coating is not transparent.

11. The coating composition of claim 9, wherein the isocyanurate comprises greater than or equal to 20 weight percent of the coating composition.

12. The coating composition of claim 9, wherein the isocyanurate comprises greater than or equal to 30 weight percent of the coating composition.

13. The coating composition of claim 9, wherein the isocyanurate comprises greater than or equal to 39 weight percent of the coating composition.

14. The coating composition of claim 9, wherein said coating is transparent.

15. The coating composition of claim 14, wherein the isocyanurate comprises greater than or equal to 20 weight percent of the coating composition.

16. The coating composition of claim 14, wherein the isocyanurate comprises greater than or equal to 30 weight percent of the coating composition.

17. The coating composition of claim 14, wherein the isocyanurate comprises greater than or equal to 39 weight percent of the coating composition.

18. A method for electrocoating a substrate, comprising electrodepositing on the substrate the coating composition of claim 1.

19. A method for electrocoating a substrate, comprising electrodepositing on the substrate the coating composition of claim 9.

20. The coating composition of claim 1, comprising greater than or equal to 39 weight percent crosslinker.

* * * * *